United States Patent
Jalali

(10) Patent No.: US 7,493,143 B2
(45) Date of Patent: Feb. 17, 2009

(54) METHOD AND SYSTEM FOR UTILIZING POLARIZATION REUSE IN WIRELESS COMMUNICATIONS

(75) Inventor: Ahmad Jalali, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 757 days.

(21) Appl. No.: 09/850,520

(22) Filed: May 7, 2001

(65) Prior Publication Data

US 2002/0164954 A1 Nov. 7, 2002

(51) Int. Cl.
*H04M 1/00* (2006.01)

(52) U.S. Cl. ............... 455/562.1; 455/561; 455/101; 455/272; 455/67.11; 342/361; 342/362

(58) Field of Classification Search ............... 455/562.1, 455/561, 101, 102, 103, 104, 105, 272, 277.1, 455/277.2, 423, 67.11, 67.13; 342/361, 362, 342/363

See application file for complete search history.

(56) References Cited

U.S. PATENT DOCUMENTS

| | | | | |
|---|---|---|---|---|
| 5,319,673 | A | * | 6/1994 | Briskman .................. 455/13.1 |
| 5,325,403 | A | * | 6/1994 | Siwiak et al. ............... 375/347 |
| 5,570,349 | A | * | 10/1996 | Bustamante et al. ........ 370/335 |
| 5,691,727 | A | * | 11/1997 | Cyzs .......................... 342/361 |
| 6,167,036 | A | * | 12/2000 | Beven ......................... 370/331 |
| 6,198,928 | B1 | * | 3/2001 | Keurulainen et al. ......... 455/436 |
| 6,212,397 | B1 | | 4/2001 | Langston et al. |
| 6,415,149 | B1 | * | 7/2002 | Bevan et al. ................. 455/442 |
| 2003/0073463 | A1 | * | 4/2003 | Shapira ....................... 455/562 |

FOREIGN PATENT DOCUMENTS

GB 2375266 A * 11/2002

OTHER PUBLICATIONS

"Smart Antennas for Broadband Wireless Access Networks", Sheikh et al., IEEE Communications Magazine, Nov. 1999, p. 100-105.

* cited by examiner

*Primary Examiner*—Minh D Dao
(74) *Attorney, Agent, or Firm*—Larry J. Moskowitz; Jeffrey D. Jacobs; Thomas R. Rouse

(57) ABSTRACT

According to a disclosed embodiment, a first plurality of pilot signals of a first polarization is received and ranked. Subsequently, a second plurality of pilot signals of a second polarization is received and ranked. Following, a pilot signal from the first and second pluralities of pilot signals is selected based on a signal quality measurement such as a signal to interference ratio. Moreover, a system can be constructed comprising antennas configured to receive pilot signals of a first and a second polarization. The system further comprises a receiver configured to demodulate the pilot signals and a CPU configured to rank the pilot signals and to select a pilot signal based on a signal quality measurement. Communication quality is improved by communicating with the base transceiver station transmitting the pilot signal providing the highest signal quality measurement.

39 Claims, 3 Drawing Sheets

METHOD AND SYSTEM FOR UTILIZING POLARIZATION REUSE IN WIRELESS COMMUNICATIONS

BACKGROUND

1. Field

The present invention generally relates to the field of wireless communication systems, and more specifically to techniques using antenna polarization in wireless communication system.

2. Background

In wireless communication systems several users share a common communication channel. To avoid interference arising from several users transmitting information over the communication channel at the same time, some form of allocation of the available channel is required. Allocation of user access to the communication channel can be achieved by various forms of multiple access protocols, such as code division multiple access (CDMA). In CDMA systems, also referred to as "spread spectrum" systems, each signal is separated from those of other users by coding the signal. Each user uniquely encodes its information signal into a transmission signal. The intended receiver, knowing the code sequences of the user, can decode the transmission signal to receive the information.

A technique for increasing the signal to interference ratio, analogous to what is utilized in FDMA ("Frequency Division Multiple Access") wireless communication systems, is to use different frequencies in different cells, or even in different sectors within a cell in order to increase signal to interference ratio. For example, a cell can be divided into three sectors, each assigned a different frequency. The same frequencies can be similarly allocated in other cells in the system, which is known as frequency reuse. Where adjacent sectors are allocated different frequencies the interference between their signals is reduced, and the signal to interference ratio for users in the two adjacent sectors is increased. Therefore, the sectors' capacity is increased with frequency reuse, but the disadvantage is that frequency reuse necessitates using more frequencies.

It would be desirable to further increase signal to interference ratios in wireless communication systems as a means to enhance and complement the presently known approaches of using different frequencies to increase signal to interference ratio at a receiver terminal. It is also further desirable to achieve an increased signal to interference ratio at the receiver terminal without expending a large amount of system bandwidth.

SUMMARY

Embodiments disclosed herein address the above stated needs by using polarization of radio signals as an additional resource to enhance and complement presently known approaches to channel allocation in order to further increase signal to interference ratios at a receiver terminal. Polarization of radio signals as a means for increasing signal to interference ratios requires minimal expenditure of additional system resources such as the allocation of more frequencies.

In one aspect of the invention, a wireless access terminal receives a first plurality of pilot signals of a first polarization, which can be, for example, vertical polarization. The pilot signals contain a data sequence which can be used to identify the sector and/or base transceiver station transmitting the pilot signals. Subsequently, the first plurality of pilot signals is ranked. Thereafter, a second plurality of pilot signals is received of a second polarization, which can be, for example, horizontal polarization, and the second plurality of pilot signals is ranked.

Following, a pilot signal from the first and second pluralities of pilot signals received and ranked is selected based on a signal quality measurement. The signal quality measurement can be, for example, a signal to interference ratio. After a pilot signal providing the highest signal quality measurement is selected, the wireless terminal communicates with that sector or base station.

In another aspect, a system can be constructed comprising antennas configured to receive orthogonally polarized pilot signals. The system further comprises a receiver configured to demodulate the pilot signals and a CPU configured to rank the pilot signals and to select a pilot signal based on a signal quality measurement. The signal quality measurement can be, for example, a signal to interference ratio.

DETAILED DESCRIPTION

The present invention is directed to method and system for utilizing polarization reuse in wireless communications. Although the invention is described with respect to specific embodiments, the principles of the invention, as defined by the claims appended herein, can obviously be applied beyond the embodiments of the description described specifically herein. Moreover, certain details have been left out in order to not obscure the inventive aspects of the invention. The specific details not described in the present application are within the knowledge of a person of ordinary skill in the art.

The drawings in the present application and their accompanying detailed description are directed to merely example embodiments of the invention. To maintain brevity, other embodiments of the invention that use the principles of the present invention are not specifically described in the present application and are not specifically illustrated by the present drawings. The word "exemplary" is used exclusively herein to mean "serving as an example, instance, or illustration." Any embodiment described herein as "exemplary" is not necessarily to be construed as preferred or advantageous over other embodiments.

Figure 1:
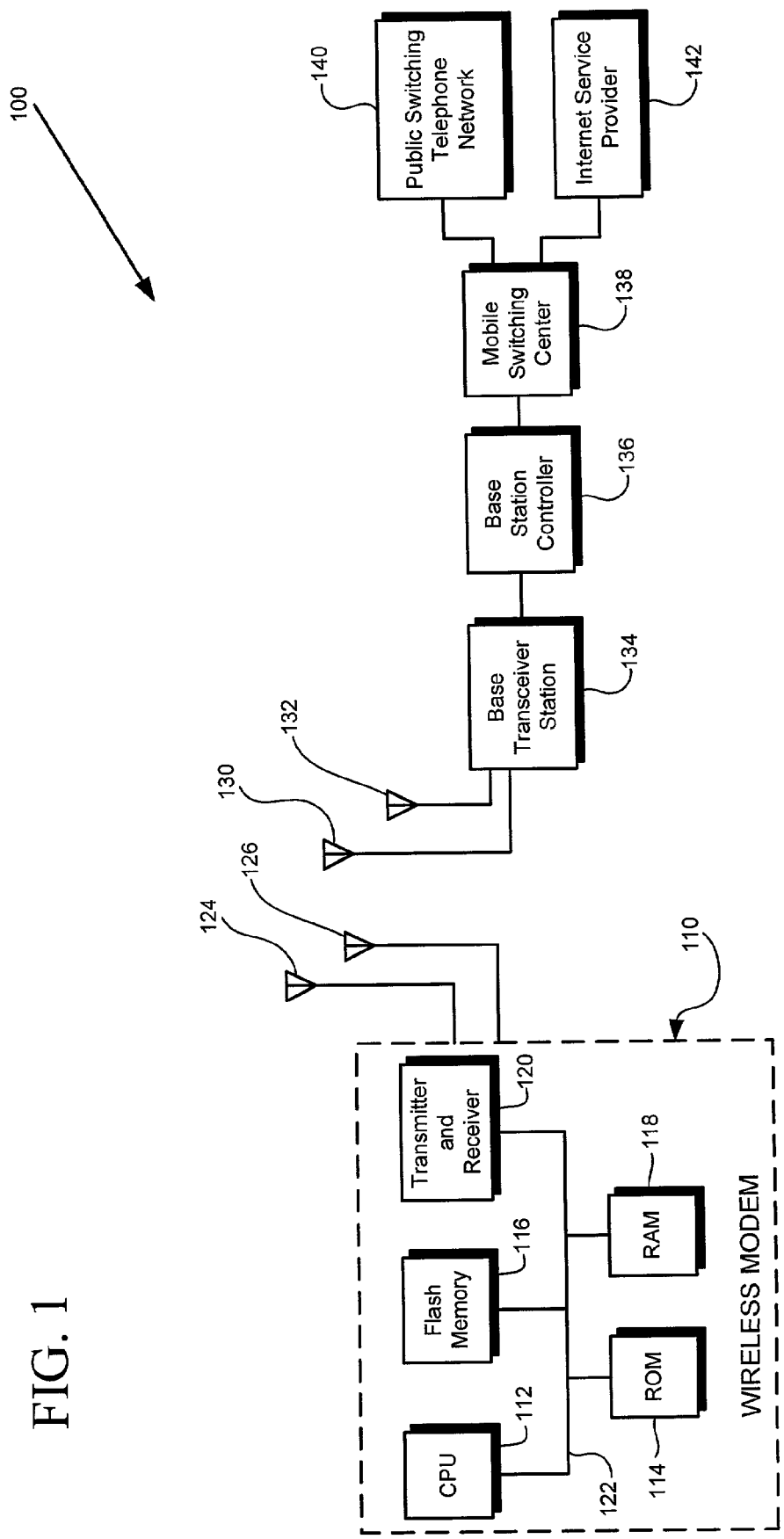
FIG. 1 shows a block diagram of an exemplary wireless modem and an exemplary wireless communication system in accordance with one embodiment of the invention.

FIG. 1 illustrates an exemplary wireless communication system in accordance with one embodiment. Exemplary wireless communication system 100 shown in FIG. 1 can comprise, for example, part of a code division multiple access ("CDMA") communication system. Alternatively, system 100 can be a frequency division multiple access ("FDMA") system, a time division multiple access ("TDMA") system, a wideband code division multiple access ("WCDMA"), a high data rate ("HDR") system, or in general any wireless communication system employing a combination of CDMA, TDMA, and/or FDMA techniques.

By way of a specific example, the present invention is discussed in relation to a CDMA communication system. However, it is understood that the invention can be used in other communications systems as stated above. The general principles of CDMA communication systems, and in particular the general principles for generation of spread spectrum signals for transmission over a communication channel is described in U.S. Pat. No. 4,901,307 entitled "Spread Spectrum Multiple Access Communication System Using Satellite or Terrestrial Repeaters" and assigned to the assignee of the present invention. The disclosure in that parent, i.e. U.S. Pat. No. 4,901,307, is hereby fully incorporated by reference into the present application. Moreover, U.S. Pat. No. 5,103,459 entitled "System and Method for Generating Signal Waveforms in a CDMA Cellular Telephone System" and assigned to the assignee of the present invention, discloses principles related to PN spreading, Walsh covering, and techniques to generate CDMA spread spectrum communication signals. The disclosure in that patent, i.e. U.S. Pat. No. 5,103,459, is also hereby fully incorporated by reference into the present application. Further, the present invention utilizes time multiplexing of data and various principles related to "high data rate" communication systems, and the present invention can be used in "high data rate" communication systems, such as that disclosed in U.S. patent application entitled "Method and Apparatus for High Rate Packet Data Transmission" Ser. No. 08/963,386 filed on Nov. 3, 1997, and assigned to the assignee of the present invention. The disclosure in that patent application is also hereby fully incorporated by reference into the present application.

Continuing with FIG. 1, exemplary wireless communication system 100, which can be a CDMA communication system, comprises components typically found in wireless communication systems, including a wireless access terminal such as wireless modem 110, base transceiver station ("BTS") 134, base station controller ("BSC") 136, mobile switching center ("MSC") 138, public switched telephone network ("PSTN") 140, and Internet service provider ("ISP") 142. In wireless communication system 100, BTS 134, which is also referred to as a "base station" in the present application, serves as a radio link between the wireless access terminal, e.g. wireless modem 110, and the rest of the system.

As illustrated in FIG. 1, BTS 134 comprises vertically polarized BTS antenna 130, which is configured to transmit and receive vertically polarized radio signals, and horizontally polarized BTS antenna 132, which is configured to transmit and receive horizontally polarized radio signals. By way of background, a vertically polarized antenna, such as vertically polarized BTS antenna 130, has an electric field perpendicular to the earth's surface while a horizontally polarized antenna, such as horizontally polarized BTS antenna 132, has an electric field parallel to the earth's surface. In a different embodiment, BTS 134 can comprise a right hand circular polarized antenna and a left hand circular polarized antenna configured to transmit and receive circular polarized radio signals. By way of background, in a circular polarized antenna, the plane of polarization rotates in a circle, making one complete revolution during one period of the radio wave. If the rotation is clockwise looking in the direction of propagation, the sense is called right hand circular. If the rotation is counterclockwise, the sense is called left hand circular. Referring back to FIG. 1, connections between BTS 134, BSC 136, MSC 138, PSTN 140, and ISP 142 can be wired, wireless, or both.

Wireless modem 110 in FIG. 1 includes, among other components which are not shown in FIG. 1, central processing unit ("CPU") 112, read only memory module ("ROM") 114, flash memory module 116, random access memory module ("RAM") 118, and transmitter and receiver 120. As shown in FIG. 1, bus 122 couples CPU 112, ROM 114, flash memory module 116, RAM 118, and transmitter and receiver 120. In accordance with one embodiment, wireless modem 110 comprises vertically polarized modem antenna 124 and horizontally polarized modem antenna 126. Vertically polarized modem antenna 124 is configured to receive and transmit vertically polarized radio signals, and horizontally polarized modem antenna 126 is configured to receive and transmit horizontally polarized radio signals. In a different embodiment, wireless modem 110 can comprise a right hand circular polarized antenna and a left hand circular polarized antenna configured to receive and transmit circular polarized radio signals. It is noted that wireless modem 110 is also referred to as a "polarized reception system" in the present application.

In accordance with the present embodiment, communication between wireless modem 110 and BTS 134 is achieved by the transmission and reception of polarized radio signals. For example, BTS 134 can communicate with wireless modem 110 by using vertically polarized BTS antenna 130 to transmit vertically polarized radio signals that are received by vertically polarized modem antenna 124. Similarly, communication between wireless modem 110 and BTS 134 could involve horizontally polarized BTS antenna 132 transmitting a horizontally polarized radio signal that is received by horizontally polarized modem antenna 126.

Continuing with FIG. 1, PSTN 140 refers to a conventional wireline telephone network, and ISP 142 refers to services providing access to the Internet. Data and voice information provided by ISP 142 and PSTN 140 can be communicated to wireless modem 110 by being routed through MSC 138, BSC 136, and BTS 134. MSC 138 functions generally as a switch between the wireless network and PSTN 140 and ISP 142, while the role of BSC 136, among others, is to manage the signal transmission power of BTS 134. For example, Internet data can be communicated to wireless modem 110 by being routed from ISP 142 through MSC 138, BSC 136, and to BTS 134 in order for BTS 134 to transmit the data to wireless modem 110 as radio frequency signals on both vertically polarized BTS antenna 130 and horizontally polarized BTS antenna 132 in a manner known in the art.

BTS 134 can, for example, transmit radio frequency signals as vertically polarized radio signals transmitted by vertically polarized BTS antenna 130 that are generally received by vertically polarized modem antenna 124. The radio frequency signals are demodulated by transmitter and receiver 120 and the information extracted at wireless modem 110. Communication between ISP 142 and wireless modem 110 is thereby completed. Thus, FIG. 1 shows a block diagram of an exemplary wireless communication system in which communication between a base transceiver station and a wireless modem is accomplished by means of polarized radio signals.

Figure 2:
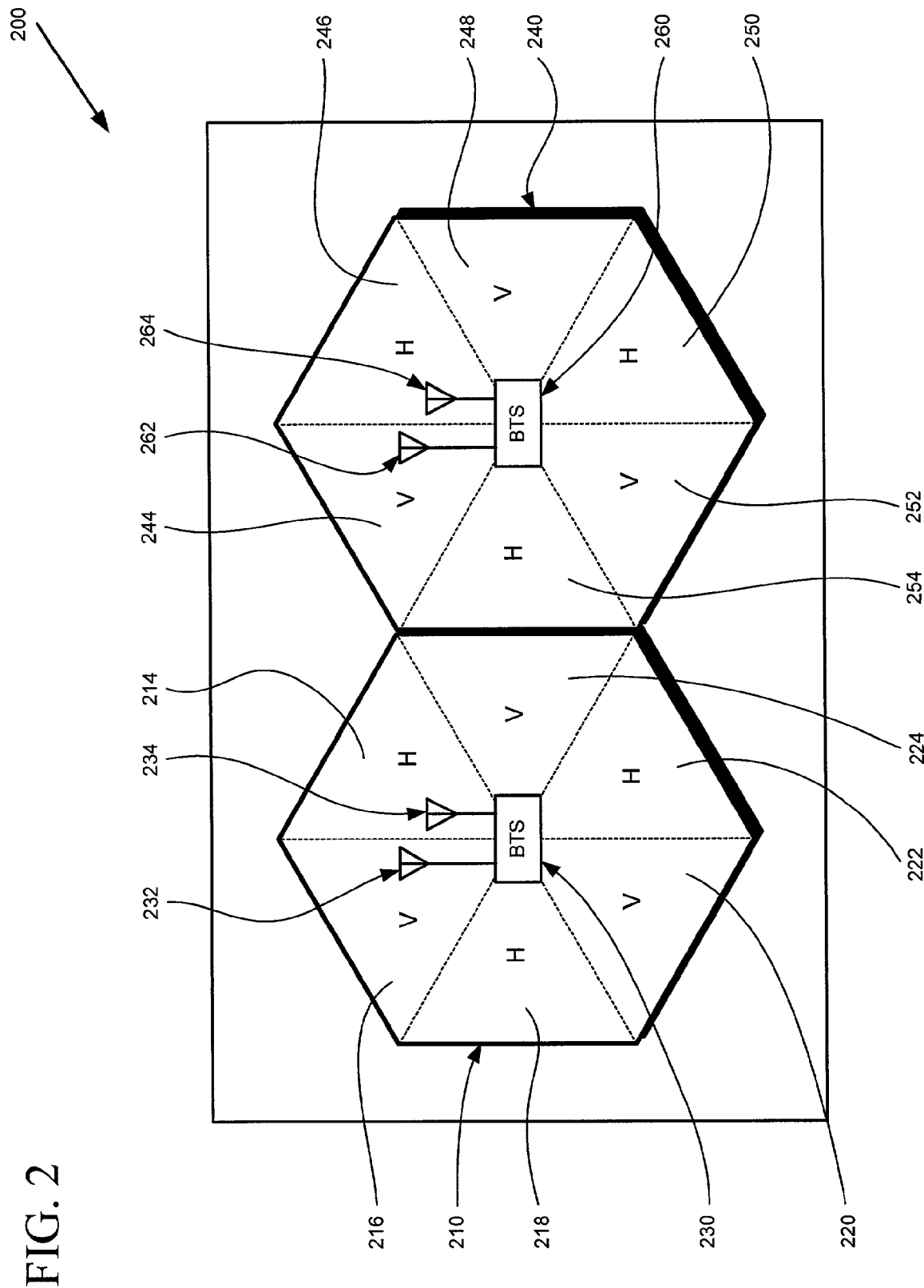
FIG. 2 shows an illustrative representation of a two cell array in a wireless communication system used to illustrate example implementations of the invention.

FIG. 2 illustrates a two cell array in a wireless communication system in accordance with one embodiment. Cell array 200 shown in FIG. 2 comprises a geographical region in a wireless communication system, which can be, for example, a CDMA communication system. Cell array 200 comprises cell 210 and cell 240 which are defined by solid lines and shown as hexagons in FIG. 2. In the present embodiment, cell 210 is divided into six sectors, which are sector 214, sector 216, sector 218, sector 220, sector 222, and sector 224. Sectors 214, 216, 218, 220, 222, and 224 are defined by dashed lines in FIG. 2. Similarly, cell 240 comprises six sectors, which are sectors 244, 246, 248, 250, 252, and 254 which are also defined by dashed lines. It is noted that an article entitled "Smart Antennas for Broadband Wireless Access Networks," authored by Khurram Sheikh, David Gesbert, Dhananjay Gore, and Arogyaswami Paulraj, published in the November 1999 issue of IEEE Communications Magazine, pages 100 through 105, discusses vertically polarized and horizontally polarized signals in adjacent sectors of a cell. However, the article does not disclose or suggest how an access terminal may take advantage of such differently polarized signals in adjacent sectors.

Referring again to FIG. 2, cell 210 of cell array 200 comprises base transceiver station ("BTS") 230 positioned at the center of cell 210. In accordance with the present embodiment, BTS 230 is equipped with vertically polarized BTS antenna 232 and horizontally polarized BTS antenna 234. Vertically polarized BTS antenna 232 is configured to transmit and receive vertically polarized radio signals, and horizontally polarized BTS antenna 234 is configured to transmit and receive horizontally polarized radio signals. Utilizing vertically polarized BTS antenna 232 and horizontally polarized BTS antenna 234, BTS 230 can communicate with wireless access terminals in cell array 200 using polarized radio signals. Wireless access terminals are not shown in FIG. 2, but can be, for example, a wireless modem such as wireless modem 110 shown in FIG. 1.

In accordance with one embodiment, BTS 230 is a sectorized base transceiver station. BTS 230 continuously broadcasts a pilot signal in each sector of cell 210 on the polarization designated for that particular sector. BTS 230 utilizes vertically polarized BTS antenna 232 to transmit vertically polarized pilot signals to sectors 216, 220 and 224 and utilizes horizontally polarized BTS antenna 234 to transmit horizontally polarized pilot signals to sectors 214, 218 and 222. By way of background, data from BTS 230 is transmitted in frames where each data frame contains an initial pilot sequence as well as a subsequent message data sequence. As an example, the initial pilot sequence may take up approximately 5% of the entire data frame. The pilot sequence is generally a known data sequence recognizable to a receiving wireless access terminal. A receiving wireless access terminal can use the data sequence contained in a pilot signal to identify the particular sector and base transceiver station transmitting the particular pilot signal. A wireless access terminal such as wireless modem 110 in FIG. 1, equipped with both vertically and horizontally polarized antennas would have the capability to receive both vertically and horizontally polarized pilot signals transmitted by BTS 230.

Continuing with FIG. 2, cell 240 is organized similarly to cell 210. Base transceiver station 260 ("BTS 260") is situated at the center of cell 210 and comprises vertically polarized BTS antenna 262 and horizontally polarized BTS antenna 264 which are configured to transmit and receive, respectively, vertically and horizontally polarized radio signals. BTS 260 is a sectorized base transceiver station which continuously broadcasts a pilot signal to each sector of cell 240 on the polarization assigned to that sector. BTS 260 utilizes vertically polarized BTS antenna 262 to transmit vertically polarized pilot signals to sectors 244, 248 and 252 and utilizes horizontally polarized BTS antenna 264 to transmit horizontally polarized pilot signals to sectors 246, 250 and 254. The pilot signals transmitted by BTS 260 can be received by wireless access terminals in cell array 200 equipped with vertically and horizontally polarized antennas. A wireless access terminal can use, for example, the unique data sequence contained in the pilot signals it receives to identify a particular sector and base transceiver station transmitting a particular pilot signal.

It is noted that even though cells 210 and 240 and their sectors have been shown in FIG. 2 as discretely defined areas, a person skilled in the art would appreciate that the radio frequency coverage area for a cell or sector commonly overlaps into adjacent cells and/or sectors. Therefore, a wireless access terminal, particularly one situated near the boundaries between adjacent cells and/or sectors, may receive signals from different cells and sectors. FIG. 2 thus illustrates a two cell array in an exemplary communication system wherein base transceiver stations situated at the center of the cells are equipped with polarized antennas to transmit polarized pilot signals in each sector. In one embodiment, the pilot signals are received by wireless access terminals which utilize a unique data sequence contained in the pilot signals in order to identify the particular sector and base transceiver station transmitting the pilot signal.

Figure 3:
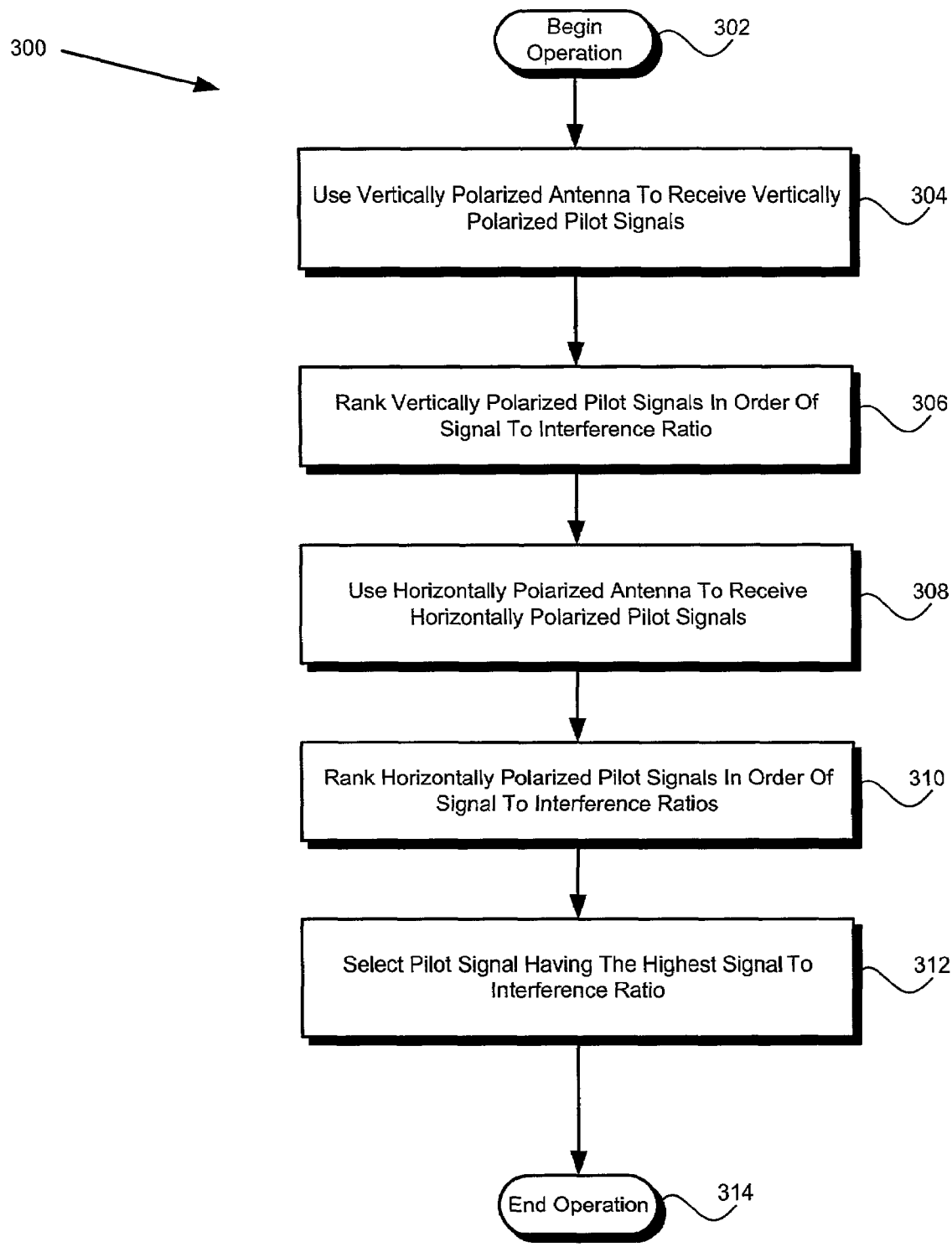
FIG. 3 is a flow chart for a process of selecting the highest signal to interference ratio in accordance with one embodiment of the invention.

Referring to FIG. 3, flow chart 300 illustrates an example method for selecting a pilot signal having a highest signal to interference ratio in accordance with one embodiment. The signal to interference ratio is a quantification of the power of the desired signal to interference signals. The signal to interference ratio therefore indicates the signal quality of the received data signal. The process illustrated in flow chart 300 in FIG. 3 describes the process as performed by a wireless access terminal in a wireless communication system, which can be, for example, a CDMA communication system. For illustrative purposes, the process shown in flow chart 300 is described in the context of wireless modem 110 in FIG. 1 and exemplary cell array 200 in FIG. 2. As such, it is manifest that the process illustrated in flow chart 300 can be practiced by an access terminal other than wireless modem 110 and in a wireless environment other than cell array 200.

Flow chart 300 illustrates the process of selecting a pilot signal having a highest signal to interference ratio beginning at step 302. The process continues at step 304 where a wireless access terminal using a vertically polarized antenna receives vertically polarized pilot signals transmitted by base transceiver stations situated throughout the wireless communication system. For example, wireless modem 110 can use vertically polarized modem antenna 124 to receive vertically polarized pilot signals transmitted by vertically polarized BTS antenna 232 and vertically polarized BTS antenna 262.

As discussed above, because signals in one sector or cell commonly overlap into nearby cells and sectors, vertically polarized modem antenna 124 may receive vertically polarized pilot signals transmitted throughout cell array 200, i.e. vertically polarized pilot signals transmitted by both vertically polarized BTS antenna 232 and vertically polarized BTS antenna 262. At the same time, vertically polarized modem antenna 124 may not receive all of the vertically polarized pilot signals transmitted by vertically polarized BTS antenna 232 and vertically polarized BTS antenna 262, depending on, for example, the power of the transmission, as well as the distance and terrain between vertically polarized modem antenna 124 and vertically polarized BTS antennas 232 and 262.

As is known in the art, radio signals lose their power over distance and can also be reflected by obstacles such as hills, buildings, and trees in their paths. Thus, when the radio signals containing the pilot signals reach vertically polarized modem antenna 124, some of the pilot signals may be too weak to be received. Furthermore, because the various pilot signals travel different paths to reach wireless modem 110, vertically polarized modem antenna 124 receives the various pilot signals at different reception power or signal to interference ratios. Once the pilot signals are received by wireless modem 110, they can be demodulated by a receiver module in transmitter and receiver 120 in order to extract the information in the pilot signals. The information signal can comprise, for example, a data sequence which identifies the base transceiver station and the sector transmitting the pilot signals. The steps involved in the demodulation of radio signals is generally known in the art.

At step 306, the vertically polarized pilot signals received by vertically polarized modem antenna 124 at wireless modem 110 are ranked by their signal to interference ratios. Ranking of vertically polarized pilot signals by their signal to interference ratios involves measuring the signal quality of each pilot signal received, comparing the signal quality of the pilot signals to one another, and ordering the pilot signals by their signal to interference ratios. Ranking of vertically polarized pilot signals by their signal to interference ratio can be performed, for example, by software running on CPU 112. The ranking can be stored, for example, in flash memory 116.

Continuing with flow chart 300, at step 308, wireless modem 110 switches from vertically polarized modem antenna 124 to horizontally polarized modem antenna 126 in order to receive horizontally polarized pilot signals. The horizontally polarized pilot signals are transmitted continuously by horizontally polarized BTS antennas 234 and 264 in cell array 200. And because radio signals can overlap into nearby cells and sectors, as discussed above, horizontally polarized modem antenna 126 may receive horizontally polarized pilot signals form throughout cell array 200. The horizontally polarized pilot signals are received by horizontally polarized modem antenna 126 at different signal to interference ratios, depending on, for example, the distance and type of terrain between horizontally polarized modem antenna 126 and the horizontally polarized BTS antennas transmitting the pilot signals.

At step 310, the horizontally polarized pilot signals received by horizontally polarized modem antenna 126 are ranked by their signal to interference ratios. As with ranking of vertically polarized pilot signals at step 306, the ranking of horizontally polarized pilot signals can involve, for example, measuring the signal quality of each pilot signal, comparing the signal quality of the pilot signals, and ordering the pilot signals in sequence of their signal to interference ratios. Ranking horizontally polarized pilot signals by their signal to interference ratio can be performed, for example, by software running on CPU 112. The ranking can be stored, for example, in flash memory 116.

At step 312, the ranking of vertically polarized pilot signals is compared to the ranking of horizontally polarized pilot signals. By comparing the two groups of rankings, the pilot signal having the highest signal to interference ratio overall can be selected. The signal to interference ratio for a pilot signal indicates the signal quality of the initial pilot sequence in a data frame as well as the signal quality of the message data sequence in the data frame received from the base transceiver station on the particular sector transmitting the pilot signal. The operation for selecting a pilot signal having the highest signal to interference ratio then ends at step 314.

After the pilot signal having the highest signal to interference ratio has been selected, wireless modem 110 uses the information contained in the pilot signal to identify and select the sector and base transceiver station transmitting the pilot signal. Wireless modem 110 sends an identification signal ("ID signal") to the base transceiver station transmitting the pilot signal. The ID signal can be, for example, an electronic serial number unique to wireless modem 110 which identifies wireless modem 110 to the base transceiver station. The ID signal informs the particular base transceiver station that wireless modem 110 has selected to communicate with that station on the particular sector which wireless modem 110 has determined to have the highest signal quality. It is noted that the ID signal is also referred to as a "sector identification" in the present application. Communications between wireless modem 110 and the selected base transceiver station on the selected sector are then performed using the same polarization as the polarization of the pilot signal having the highest signal to interference ratio. Thus, flow chart 300 in FIG. 3 illustrates a process for selecting a pilot signal having the highest signal to interference ratio and communicating with the sector and base transceiver station transmitting the pilot signal having the highest signal to interference ratio so as to improve signal reception quality in accordance with one embodiment.

The steps shown in flow chart 300 to receive and rank pilot signals, and thereafter communicate with a selected base station on a sector having the highest quality signal are repeated periodically, such as every few days. The reason is that due to terrain changes, for example changes in the configuration of obstacles such as buildings and trees in the signal path, it is necessary to periodically determine whether a different base transceiver station and/or a different sector should be used for communication with wireless modem 110. It is noted that although the present example uses the signal to interference ratio as the signal quality measurement for ranking and selecting pilot signals, it is manifest that other signal quality measurements can be used. For example, a signal to noise ratio measurement can also be used. It is also noted that although the present application was discussed in relation to vertically polarized and horizontally polarized signals, the invention can also be used with right hand circular polarized and left hand circular polarized signals.

In another embodiment which is not illustrated in any of the Figures in the present application, a wireless access terminal, such as wireless modem 110, utilizes the process set forth in FIG. 3 to receive and select a polarized pilot signal having a highest signal to interference ratio. Subsequently, the wireless access terminal communicates with a number of sectors corresponding to one or more base transceiver stations on the same polarization as the polarization of the pilot signal providing the highest signal to interference ratio. Each of the sectors of the one or more base transceiver stations would be configured to transmit on the same polarization as the polarization of the pilot signal. For example, if the pilot signal having the highest signal to interference ratio is received on a vertically polarized antenna, the wireless access terminal would communicate with a number of "vertically polarized sectors" in one or more base transceiver stations by means of vertically polarized radio signals. In this embodiment, the vertically polarized signals from the base transceiver stations are received and then combined to generate diversity.

In its various embodiments, the present invention is a system and method for "polarization reuse." As discussed in the present application, polarization reuse involves allocating orthogonal polarizations to adjacent sectors, rather than allocating different frequencies to adjacent sectors. Using the polarization reuse system and method described above, interference between various sectors is reduced because their signals are polarized perpendicularly to one another. One advantage of polarization reuse described above is that it increases the overall system capacity without requiring the allocation of more frequencies.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit ("ASIC"). The ASIC may reside in a wireless modem. In the alternative, the processor and the storage medium may reside as discrete components in the wireless modem.

The previous description of the disclosed embodiments is provided to enable any person skilled in the art to make or use the present invention. Various modifications to these embodiments will be readily apparent to those skilled in the art, and the principles defined herein may be applied to other embodiments without departing from the spirit or scope of the invention. For example, in the embodiment of the invention described above, the access terminal, i.e. wireless modem 110, has a single receiver. In this embodiment, a single receiver within transmitter and receiver module 120 must be switched between the different wireless modem antennas, such as vertically polarized antenna 124 and horizontally polarized antenna 126, so that wireless modem 110 can receive and rank the highest signal to interference ratio as described above. In an alternative embodiment, the access terminal would have a dedicated receiver for each antenna. In that embodiment, the dedicated receivers are not switched between the various antennas of the access terminal.

It is noted that in one embodiment, the polarization reuse technique of the present invention can be employed in addition to the conventional frequency reuse. It is also noted that the invention can be used in a MIMO ("multiple input multiple output") system where multiple transmit antennas and multiple receive antennas are used by the communication channel to carry multiple streams of user data. Therefore, the present invention is not intended to be limited to the embodiments shown herein but is to be accorded the widest scope consistent with the principles and novel features disclosed herein.

Thus, method and system for utilizing polarization reuse in wireless communications have been described.

What is claimed is:

1. A method comprising steps of:
    receiving a first plurality of pilot signals of a first polarization;
    performing at least one signal quality measurement of said first plurality of pilot signals, wherein said first plurality of pilot signals are ranked based on said at least one signal quality measurement;
    receiving a second plurality of pilot signals of a second polarization;
    performing at least one signal quality measurement of said second plurality of pilot signals, wherein said second plurality of pilot signals are ranked based on said at least one signal quality measurement; and
    selecting a pilot signal from said first plurality signals and said second plurality of pilot signals based on said ranked signal quality measurements.

2. The method of claim 1 further comprising a step of demodulating said first plurality of pilot signals after said step of receiving said first plurality of pilot signals and before said step of performing said at least one signal quality measurement of said first plurality of pilot signals.

3. The method of claim 1 further comprising of step of demodulating said second plurality of pilot signals after said step of receiving said second plurality of pilot signals and before said step of performing said at least one signal quality measurement of said second plurality of pilot signals.

4. The method of claim 1 wherein said first polarization is orthogonal to said second polarization.

5. The method of claim 1 wherein said first polarization and said second polarization are selected from the group consisting of a vertical polarization and a horizontal polarization.

6. The method of claim 1 wherein said first polarization and said second polarization are selected from the group consisting of a right hand circular polarization and a left hand circular polarization.

7. The method of claim 1 wherein said at least one signal quality measurement comprises a signal to interference ratio.

8. The method of claim 1 wherein said at least one signal quality measurement comprises a signal to noise ratio.

9. A method comprising steps of:
    measuring a first signal quality of a first plurality of polarized pilot signals received utilizing a first polarized reception system, wherein each pilot signal of said first plurality of polarized pilot signals identifies one of a first plurality of sectors;
    measuring a second signal quality of a second plurality of polarized pilot signals received utilizing a second polarized reception system, wherein each pilot signal of said second plurality of polarized pilot signals identifies one of a second plurality of sectors;
    selecting a sector from said first plurality of sectors and said second plurality of sectors by comparing said first signal quality with said second signal quality, wherein said selecting is based upon ranking at least one of said first plurality of polarized pilot signals and ranking at least one of said second plurality of polarized pilot signals.

10. The method of claim 9 wherein said first plurality of polarized pilot signals is orthogonal to said second plurality of polarized signals.

11. The method of claim 9 wherein said first signal quality is measured by using a signal to interference ratio.

12. The method of claim 9 wherein said second signal quality is measured by using a signal to interference ratio.

13. The method of claim 9 wherein said first signal quality is measured by using a signal to noise ratio.

14. The method of claim 9 wherein said second signal quality is measured by using a signal to noise ratio.

15. The method of claim 9 wherein said selecting step comprises sending a sector identification to a base station.

16. The method of claim 9 wherein said step of ranking said at least one of said plurality of polarized pilot signals is based on a signal to interference ratio measurement.

17. The method of claim 9 wherein said step of ranking said at least one of said second plurality of polarized pilot signals is based on a signal to interference ratio measurement.

18. A system comprising:
a first antenna configured to receive a first plurality of pilot signals of a first polarization;
a second antenna configured to receive a second plurality of pilot signals of a second polarization;
a receiver configured to demodulate said first plurality of pilot signals of said first polarization and said second plurality of pilot signals of said second polarization; and
a CPU configured to rank said pilot signals of said first plurality and said second plurality, said CPU being further configured to select a pilot signal from said ranking of pilot signals based on signal quality measurements, wherein at least one of said first plurality of pilot signals and at least one of said second plurality of pilot signals are differently polarized and include different data.

19. The system of claim 18, wherein said CPU is further configured to generate said rank as a first ranking of said first plurality of pilot signals and a second ranking of said second plurality of pilot signals and a flash memory module to store said first and second rankings.

20. The system of claim 19 wherein said first ranking is based on a signal to interference ratio.

21. The system of claim 19 wherein said second ranking is based on said signal to interference ratio.

22. The system of claim 18 wherein said first polarization is orthogonal to said second polarization.

23. The system of claim 18 wherein said first polarization and said second polarization are selected from the group consisting of vertical polarization and a horizontal polarization.

24. The system of claim 18 wherein said first polarization and said second polarization are selected from the group consisting of a right hand circular polarization and a left hand circular polarization.

25. The system of claim 18 wherein said signal quality measurements comprise a signal to interference ratio.

26. The system of claim 18 wherein said signal quality measurements comprise a signal to noise ratio.

27. An apparatus comprising:
means for receiving a first plurality of pilot signals of a first polarization;
means for performing at least one signal quality measurement of said first plurality of pilot signals, wherein said first plurality of pilot signals are ranked based on said at least one signal quality measurement;
means for receiving a second plurality of pilot signals of a second polarization;
means for performing at least one signal quality measurement of said second plurality of pilot signals, wherein said second plurality of pilot signals are ranked based on said at least one signal quality measurement; and
means for selecting a pilot signal from said first plurality signals and said second plurality of pilot signals based on said ranked signal quality measurements.

28. The apparatus of claim 27 further comprising means for demodulating said first plurality of pilot signals after said receiving said first plurality of pilot signals and before said performing said at least one signal quality measurement of said first plurality of pilot signals.

29. The apparatus of claim 27 further comprising means for demodulating said second plurality of pilot signals after said receiving said second plurality of pilot signals and before said performing said at least one signal quality measurement of said second plurality of pilot signals.

30. The apparatus of claim 27 wherein said first polarization is orthogonal to said second polarization.

31. The apparatus of claim 27 wherein said first polarization and said second polarization are selected from the group consisting of a vertical polarization and a horizontal polarization.

32. The apparatus of claim 27 wherein said first polarization and said second polarization are selected from the group consisting of a right hand circular polarization and a left hand circular polarization.

33. The apparatus of claim 27 wherein said at least one signal quality measurement comprises a signal to interference ratio.

34. The apparatus of claim 27 wherein said at least one signal quality measurement comprises a signal to noise ratio.

35. An apparatus comprising:
means for measuring a first signal quality of a first plurality of polarized pilot signals received utilizing a first polarized reception system, wherein each pilot signal of said first plurality of polarized pilot signals identifies one of a first plurality of sectors;
means for measuring a second signal quality of a second plurality of polarized pilot signals received utilizing a second polarized reception system, wherein each pilot signal of said second plurality of polarized pilot signals identifies one of a second plurality of sectors;
means for selecting a sector from said first plurality of sectors and said second plurality of sectors by comparing said first signal quality with said second signal quality, wherein said selecting is based upon ranking at least one of said first plurality of polarized pilot signals and ranking at least one of said second plurality of polarized pilot signals.

36. The apparatus of claim 35 wherein said first plurality of polarized pilot signals is orthogonal to said second plurality of polarized signals.

37. The apparatus of claim 35 wherein said means for selecting comprises means for sending a sector identification to a base station.

38. The apparatus of claim 35 wherein said ranking said at least one of said plurality of polarized pilot signals is based on a signal to interference ratio measurement.

39. The apparatus of claim 35 wherein said ranking said at least one of said second plurality of polarized pilot signals is based on a signal to interference ratio measurement.

* * * * *